(12) United States Patent
 Chung et al.

(10) Patent No.: US 10,985,662 B2
(45) Date of Patent: Apr. 20, 2021

(54) POWER CONVERTER RESPONSIVE TO DEVICE CONNECTION STATUS

(71) Applicant: SEMICONDUCTOR COMPONENTS INDUSTRIES, LLC, Phoenix, AZ (US)

(72) Inventors: BongGeun Chung, Siheung-si (KR); Gwanbon Koo, Sunnyvale, CA (US); Taesung Kim, Seoul (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 114 days.

(21) Appl. No.: 16/390,349

(22) Filed: Apr. 22, 2019

(65) Prior Publication Data

US 2019/0245448 A1 Aug. 8, 2019

Related U.S. Application Data

(63) Continuation of application No. 15/705,389, filed on Sep. 15, 2017, now Pat. No. 10,320,301.

(51) Int. Cl.
*H02M 3/335* (2006.01)
*H02M 1/08* (2006.01)
*H02M 1/00* (2006.01)
*H02M 1/36* (2007.01)

(52) U.S. Cl.
CPC ......... *H02M 3/33523* (2013.01); *H02M 1/08* (2013.01); *H02M 1/36* (2013.01); *H02M 2001/0032* (2013.01); *H02M 2001/0048* (2013.01)

(58) Field of Classification Search
CPC .. H02M 1/08; H02M 1/36; H02M 2001/0032; H02M 2001/0048
See application file for complete search history.

(56) References Cited

U.S. PATENT DOCUMENTS

| | | | |
|---|---|---|---|
| 5,034,871 A | 7/1991 | Okamoto et al. | |
| 5,835,365 A | 11/1998 | Lee | |
| 6,252,783 B1 * | 6/2001 | Huh | H02M 3/33523 363/21.01 |
| 6,504,267 B1 | 1/2003 | Giannopoulos | |
| 7,133,300 B1 | 11/2006 | Yang | |

(Continued)

OTHER PUBLICATIONS

Chung et al., "Variable Blanking Frequency for Resonant Converters", Jun. 29, 2017.

(Continued)

*Primary Examiner* — Yusef A Ahmed
(74) *Attorney, Agent, or Firm* — Wash Park IP Ltd.; John T. Kennedy

(57) ABSTRACT

Various embodiments of apparatuses, systems, and methods for controlling the operating status of a power converter during, a standby mode, a powered mode, and a transition from the standby mode to the powered mode is described. For at least one embodiment, a power converter includes a primary controller and a secondary controller wherein the primary controller includes a first circuit configured to initiate a transition from standby mode to powered mode upon receipt of a wake-up signal and wherein the first circuit is powered during standby mode.

20 Claims, 9 Drawing Sheets

(56) References Cited

U.S. PATENT DOCUMENTS

| | | | |
|---|---|---|---|
| 7,239,532 B1* | 7/2007 | Hsu | H02M 3/33523 363/21.12 |
| 7,684,216 B2 | 3/2010 | Choi | |
| 8,369,111 B2 | 2/2013 | Balakrishnan et al. | |
| 8,441,810 B2 | 5/2013 | Telefus et al. | |
| 8,804,380 B2 | 8/2014 | Gao et al. | |
| 8,897,038 B2 | 11/2014 | Li | |
| 9,225,199 B2 | 12/2015 | Teggatz et al. | |
| 9,318,951 B2 | 4/2016 | Shirahata et al. | |
| 9,444,349 B2 | 9/2016 | Sato | |
| 9,893,638 B1 | 2/2018 | Strijker | |
| 9,991,812 B2 | 6/2018 | Chung et al. | |
| 10,033,285 B1* | 7/2018 | Zhang | H02M 1/32 |
| 10,141,830 B1 | 11/2018 | Chung | |
| 2001/0010638 A1 | 8/2001 | Konno | |
| 2002/0080625 A1 | 6/2002 | Goyhenetche et al. | |
| 2007/0138971 A1 | 6/2007 | Chen | |
| 2008/0075494 A1* | 3/2008 | Matsuo | G03G 15/5004 399/70 |
| 2008/0265849 A1 | 10/2008 | Lee | |
| 2008/0266907 A1 | 10/2008 | Kim | |
| 2010/0135050 A1* | 6/2010 | Sonobe | H02M 1/36 363/21.07 |
| 2010/0149840 A1 | 6/2010 | Hayasaki | |
| 2010/0157631 A1 | 6/2010 | Lim | |
| 2010/0195355 A1 | 8/2010 | Zheng | |
| 2010/0202161 A1 | 8/2010 | Sims et al. | |
| 2011/0012554 A1 | 1/2011 | Lin et al. | |
| 2011/0013431 A1 | 1/2011 | Chiang | |
| 2011/0019446 A1* | 1/2011 | Wu | H02M 3/33523 363/79 |
| 2011/0051463 A1 | 3/2011 | Chen | |
| 2011/0103101 A1 | 5/2011 | Hiasa | |
| 2011/0103104 A1 | 5/2011 | Zhan et al. | |
| 2011/0157925 A1* | 6/2011 | Wang | H02M 3/33507 363/21.17 |
| 2011/0182088 A1 | 7/2011 | Lidak | |
| 2011/0291575 A1 | 12/2011 | Shiu et al. | |
| 2012/0008342 A1 | 1/2012 | Hsu | |
| 2012/0113689 A1 | 5/2012 | Chen | |
| 2012/0147631 A1 | 6/2012 | Nate | |
| 2012/0194131 A1* | 8/2012 | Osswald | H02M 3/33523 320/112 |
| 2013/0003421 A1 | 1/2013 | Fang | |
| 2013/0170621 A1 | 7/2013 | Saka | |
| 2013/0236206 A1 | 9/2013 | Shoji | |
| 2013/0250627 A1* | 9/2013 | Herfurth | H02M 3/3376 363/21.15 |
| 2013/0301310 A1 | 11/2013 | Wang | |
| 2013/0301311 A1* | 11/2013 | Wang | H02M 3/33515 363/21.13 |
| 2014/0016359 A1 | 1/2014 | Telefus et al. | |
| 2014/0016362 A1 | 1/2014 | Adragna et al. | |
| 2014/0071717 A1 | 3/2014 | Murata | |
| 2014/0078789 A1 | 3/2014 | Li | |
| 2014/0092647 A1 | 4/2014 | Ren et al. | |
| 2014/0146580 A1 | 5/2014 | Koo et al. | |
| 2014/0159678 A1 | 6/2014 | Park | |
| 2014/0192565 A1 | 7/2014 | Wang | |
| 2014/0192566 A1 | 7/2014 | Yang | |
| 2014/0240873 A1 | 8/2014 | Saka | |
| 2014/0268919 A1* | 9/2014 | Yao | H02M 3/33523 363/21.15 |
| 2014/0301117 A1 | 10/2014 | Hirabayashi | |
| 2014/0321167 A1* | 10/2014 | Klein | H02M 3/33507 363/16 |
| 2015/0016152 A1* | 1/2015 | Kojima | H02M 3/33569 363/21.02 |
| 2015/0036389 A1* | 2/2015 | Freeman | H02M 3/3374 363/16 |
| 2015/0145565 A1* | 5/2015 | Brinlee | H03K 17/0822 327/109 |
| 2015/0180355 A1* | 6/2015 | Freeman | H02M 3/158 363/21.04 |
| 2015/0244274 A1 | 8/2015 | Fahlenkamp | |
| 2015/0280576 A1 | 10/2015 | Hinz et al. | |
| 2015/0285872 A1 | 10/2015 | Chung | |
| 2015/0303816 A1 | 10/2015 | Tumminaro et al. | |
| 2015/0318777 A1 | 11/2015 | Pasqua | |
| 2015/0349624 A1 | 12/2015 | Wang et al. | |
| 2016/0036339 A1 | 2/2016 | Kikuchi | |
| 2016/0056704 A1* | 2/2016 | Deboy | H02M 3/33592 363/21.13 |
| 2016/0072399 A1 | 3/2016 | Kikuchi | |
| 2016/0079874 A1 | 3/2016 | Lin et al. | |
| 2016/0141951 A1 | 5/2016 | Mao | |
| 2016/0149490 A1 | 5/2016 | Nakamura | |
| 2016/0149504 A1 | 5/2016 | Quigley | |
| 2016/0164425 A1 | 6/2016 | Chen | |
| 2016/0181932 A1 | 6/2016 | Kikuchi | |
| 2016/0181934 A1 | 6/2016 | Kikuchi | |
| 2016/0181935 A1 | 6/2016 | Kikuchi | |
| 2016/0241148 A1 | 8/2016 | Kizilyalli | |
| 2016/0241150 A1 | 8/2016 | Hsu | |
| 2016/0261202 A1 | 9/2016 | Kikuchi | |
| 2016/0261204 A1 | 9/2016 | Kikuchi | |
| 2016/0308452 A1 | 10/2016 | Motoki | |
| 2016/0329816 A1 | 11/2016 | Zhang et al. | |
| 2016/0344296 A1 | 11/2016 | Luo et al. | |
| 2016/0352232 A1 | 12/2016 | Chang | |
| 2016/0352237 A1 | 12/2016 | Quigley | |
| 2016/0359421 A1 | 12/2016 | Lin et al. | |
| 2017/0033698 A1 | 2/2017 | Vemuri | |
| 2017/0047846 A1 | 2/2017 | Teo et al. | |
| 2017/0054374 A1 | 2/2017 | Fang | |
| 2017/0054376 A1 | 2/2017 | Quigley | |
| 2017/0063243 A1 | 3/2017 | Gong | |
| 2017/0099047 A1 | 4/2017 | Hsiao et al. | |
| 2017/0133842 A1 | 5/2017 | Freeman | |
| 2017/0149339 A1 | 5/2017 | Kawashima | |
| 2017/0222565 A1 | 8/2017 | Sonobe | |
| 2017/0250612 A1 | 8/2017 | Malinin et al. | |
| 2017/0264206 A1 | 9/2017 | Rana | |
| 2017/0302186 A1 | 10/2017 | Kikuchi | |
| 2017/0317602 A1 | 11/2017 | Kleinpenning et al. | |
| 2017/0338746 A1 | 11/2017 | Chen et al. | |
| 2017/0366092 A1* | 12/2017 | Langeslag | H02M 1/08 |
| 2018/0006569 A1 | 1/2018 | Kikuchi | |
| 2018/0019677 A1 | 1/2018 | Chung et al. | |
| 2018/0041132 A1 | 2/2018 | Fang | |
| 2018/0109197 A1 | 4/2018 | Quigley | |
| 2018/0342954 A1 | 11/2018 | Chung | |
| 2018/0351462 A1 | 12/2018 | Li | |
| 2018/0358832 A1 | 12/2018 | Son | |
| 2019/0058343 A1* | 2/2019 | Liu | H02J 7/022 |
| 2019/0068062 A1* | 2/2019 | Chung | H02H 7/122 |
| 2019/0098713 A1 | 3/2019 | Ye | |
| 2020/0287454 A1 | 9/2020 | Lee | |

OTHER PUBLICATIONS

Fairchild Semiconductor Corp, "Design and Application of Primary-Side Regulation (PSR) PWM Controller", Nov. 16, 2011, Publisher: Fairchild Semiconductor Corp.

Fairchild Semiconductor Corp, "Design Guideline for Primary Side Regulated (PSR) Flyback Converter Using FNA 103 and FSEZ13X7", Nov. 16, 2010.

U.S. Appl. No. 16/390,396, filed Apr. 22, 2019.
U.S. Appl. No. 16/390,449, filed Apr. 22, 2019.
U.S. Appl. No. 16/390,486, filed Apr. 22, 2019.
U.S. Appl. No. 16/390,486, Non-final Office Action, dated Feb. 19, 2021.
U.S. Appl. No. 16/390,396, Notice of Allowance, dated Dec. 16, 2020.
U.S. Appl. No. 16/390,449, Non-Final Office Action, dated Feb. 4, 2021.

* cited by examiner

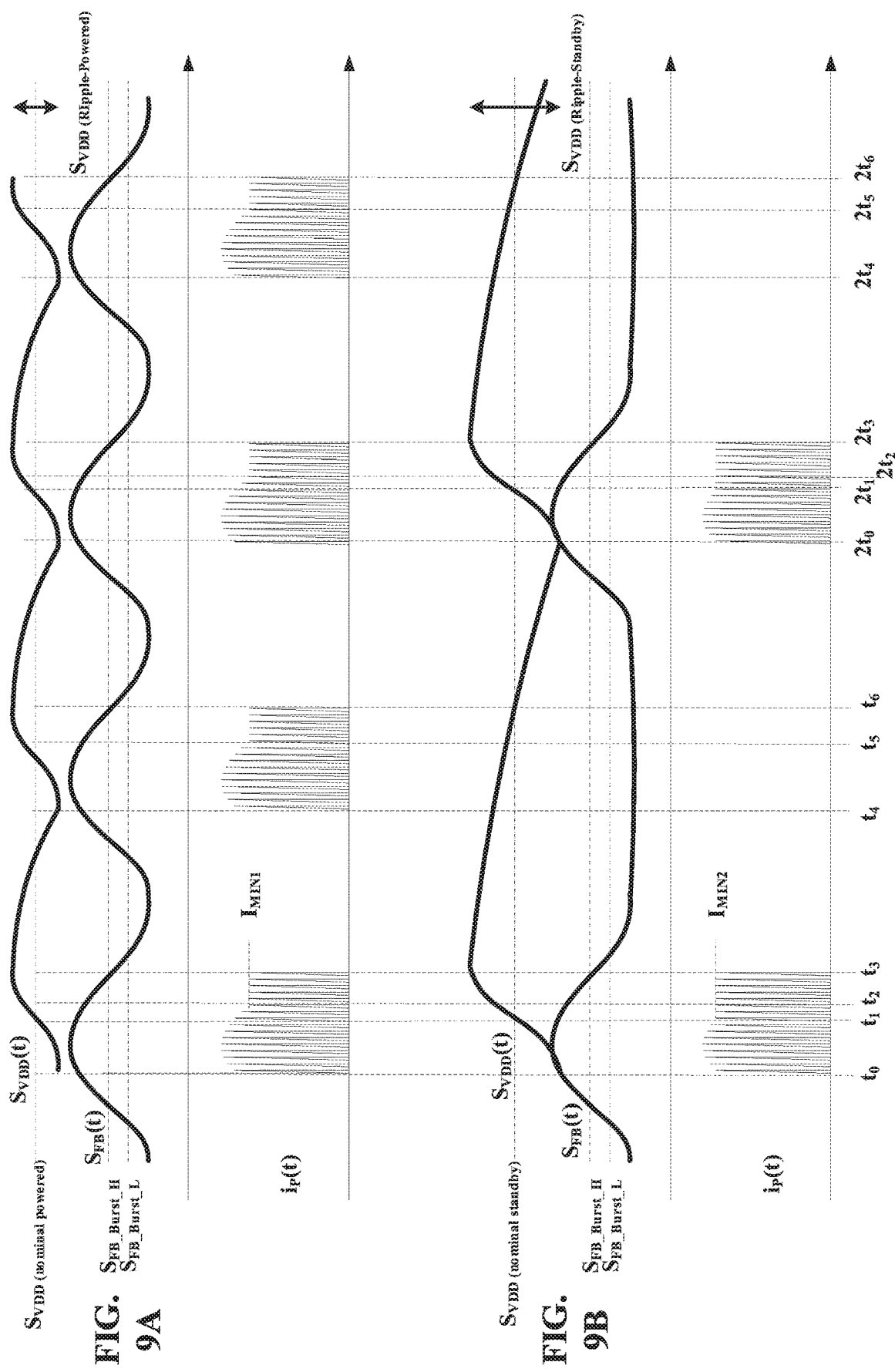

POWER CONVERTER RESPONSIVE TO DEVICE CONNECTION STATUS

CROSS-REFERENCE TO RELATED APPLICATIONS

The present application claims priority to U.S. Utility patent application Ser. No. 15/705,389, filed on Sep. 15, 2017, in the name of inventors BongGuen Chung et. al., and entitled "Power Converter Responsive to Device Connection Status," the entire contents of which are incorporated herein by reference.

TECHNICAL FIELD

The technology described herein generally relates methods, systems, and apparatus for controlling currents and voltages produced by power converters. The technology described herein also relates to methods, systems, and apparatus for controlling currents and voltages produced by switch mode operated power converters. More specifically, the technology described herein relates to methods, systems, and apparatus for controlling voltages and currents, using switch mode power converters, during standby periods and when power is not needed to awaken a power converter to power a device. The technology may find use in conjunction with various electronic devices, such as power converters configured for use with personal communications devices, such as mobile phones and tablets, and with other devices which have varying load needs and whose needs for voltages and currents vary over time.

BACKGROUND

Today, power converters are commonly used in conjunction with various devices such as mobile phones, tablets, computers, and other adaptive and non-adaptive devices (hereafter, each an "adaptive device") to convert line voltages, such as the U.S. standard 120 volts AC, into various output voltages and currents (hereafter, each a "load request") then desired by an adaptive device. Power converters commonly operate in at least two modes, powered mode and standby mode. During powered mode, power converters commonly convert input voltages and currents, such as those provided from an electrical circuit provided in a house, business or otherwise (an "input power"), into the voltages and currents requested by an adaptive device (a "load"). However, while power converters often remain connected to a source, adaptive devices are not always connected to or acting as a load to the power converter—such non-connected/non-load mode of operation for a power converter being referred to herein as "standby mode." While in standby mode, power converters today typically continue to draw power from the source and convert such input power into low-level voltages and currents needed by the power converter itself to remain responsive to a later arising load.

While the continual powering of a power converter during standby mode enables the power converter to be highly responsive to load requests, it wastes energy. In some existing implementations, as much as 20-30 milliwatts of power is wasted during standby mode (hereafter, "standby power"). Over extended periods of time and in view of the millions of power converters in present use today, such power losses from standby power can be substantial.

One type of power converter commonly used today is a switch mode power supply. Switch mode power supplies commonly include a transformer having a first (primary) coil, a second (secondary) coil, and a third (sensing) coil. The primary coil is commonly connected to the input power source and the secondary coil is commonly connected to the adaptive device. During power mode, the primary coil, secondary coil, and sensing coil operate per design and often efficiently convert input power into the desired load. During standby mode, however, the primary coil connected to the input power source typically operates to maintain an output voltage at a constant voltage (such as 5 volts) although no load is connected. This providing of the 5 volts to the secondary coil enables the power converter to respond quickly to load demands But, as discussed above, this approach wastes power.

While it is appreciated that a primary coil can be powered down by opening a circuit between the primary coil and the input power source, it is to be appreciated that such an approach often involves human intervention to reactivate the primary coil. That is, per such an approach, the connecting of an adaptive device (or the generation of a new load request from an already connected adaptive device) commonly requires human intervention to power on the primary coil as no known mechanism exists today for automatically activating a primary coil of a powered down power converter.

Accordingly, a power converter is needed that has a primary coil that can be powered down during standby mode and thereby not waste power, but, can be automatically awakened and responsive to new load requests, as needed.

The various embodiments of the present disclosure address the above and other concerns by providing for highly sophisticated control of standby mode of power converters and, in particular, switch mode power converters, by providing a secondary side control circuit that is capable of receiving a new load request from a connected adaptive device, and is configured to respond to such new load request by activating a primary side of the power converter without human intervention.

SUMMARY

In accordance with at least one embodiment of the present disclosure an apparatus, system, or method for minimizing power consumed by a primary side of a power converter during standby mode and, in response to a new load request, automatically enabling powered mode of operation is provided.

In accordance with at least one embodiment of the present disclosure, a power converter comprises a primary controller configured to control the operating status of a first coil of a transformer during a standby mode, a powered mode, and a transition from the standby mode to the powered mode. For at least one embodiment, the primary controller may further comprise a primary switch controller and driver circuit, a first circuit configured to initiate transition of the primary switch controller and driver circuit from the standby mode to the powered mode upon receipt of a wake-up signal, wherein the first circuit is a first wake-up circuit that is powered during standby mode. A secondary controller, electrically connected to a second coil of the transformer, may be included in the power converter and further comprise a second circuit configured to detect a connecting of a device to the power converter.

For at least one embodiment, the second circuit may be a secondary wake-up circuit and the secondary controller may be powered by the device during the transition from the standby mode to the powered mode. The secondary controller may be configured to output the wake-up signal when the device is connected to the power converter. The primary switch controller and driver circuit are not powered during standby mode.

For at least one embodiment, the power converter may include an opto-coupler configured to transmit the wake-up signal from the secondary controller to the primary controller.

For at least one embodiment, the secondary wake-up circuit may be configured to detect the connecting of the device to the secondary controller upon receipt of a device wake-up signal.

For at least one embodiment, the secondary wake-up circuit may be configured to monitor voltage potentials formed across a voltage divider circuit to detect when the device is electrically connected to the power converter. The power converter provides a first resistive element of the voltage divider circuit. The device provides a second resistive element of the voltage divider circuit. A voltage divider circuit is formed when the device is electrically connected to the power converter. A first voltage potential is formed when the power converter is not electrically connected to the device. A second voltage potential is formed when the power converter is electrically connected to the device.

For at least one embodiment, the secondary controller is configured for use with an electrical circuit formed with the device. For at least one embodiment, the electrical circuit includes a detecting circuit configured to detect the formation of an electrical connection between the device and the power converter. For at least one embodiment, the electrical circuit includes and a signaling circuit configured to operate a device switch, wherein upon closure of the device switch a device battery provides electrical power to the secondary controller. For at least one embodiment, at least one of the detecting circuit and the signaling circuit are provided by the device For at least one embodiment, during standby mode the primary switch controller and driver circuit control the operation of a primary switch connected to the first coil to maintain a no-load output voltage.

For at least one embodiment, the secondary controller comprises a compensator circuit configured to control output ripples generated by the second coil.

For at least one embodiment, a compensator comprises an amplifier configured to compare a reference voltage signal with a threshold voltage and output a compared reference voltage signal, wherein the reference voltage signal represents the output voltage of the power converter, and the threshold voltage is predetermined. For at least one embodiment, a compensator comprises a variable resistor, electrically connected to the amplifier, and configured to adjust the adjust the voltage of the compared reference voltage signal. For at least one embodiment, when a device is connected to the second controller, the compensator outputs a first feedback signal, and when a device is not connected to the second controller, the compensator outputs a second feedback signal. For at least one embodiment, the second circuit comprises an attachment detector configured to decrease the resistance of the variable resistor when the device is attached to the power converter and to increase the resistance of the variable resistor when the device is detached from the power converter.

For at least one embodiment, a power converter comprises a primary controller configured to control the operating status of a first coil of a transformer during a standby mode, a powered mode, and a transition from the standby mode to the powered mode. For at least one embodiment, the primary controller comprises a primary switch controller and driver circuit. For at least one embodiment, the primary switch controller and driver circuit are not powered during standby mode. For at least one embodiment, the primary controller comprises a primary powered coil wake-up circuit configured to initiate transition of the primary controller from the standby mode to the powered mode upon detection of a primary voltage signal induced in a third coil of the transformer. For at least one embodiment, the primary voltage signal is induced in the third coil of the transformer upon the powering of the second coil by a device electrically connected to the second coil.

For at least one embodiment, a power converter comprises a secondary controller, electrically connected to a second coil of the transformer, and configured to control the powering of the second coil during standby mode. For at least one embodiment, the secondary controller comprises a secondary wake-up circuit configured to detect a connecting of the device to the power converter and a secondary switch controller configured to control a duty cycle of a second switch electrically connected to the second coil. For at least one embodiment, the secondary switch controller closes the second switch upon detection by the secondary wake-up circuit of the connection of the device to the power converter. For at least one embodiment, a device battery powers the second coil during the transition from standby mode to powered mode.

For at least one embodiment, a secondary wake-up circuit is configured to detect the connecting of the device to the power converter by monitoring voltage potentials formed across a voltage divider circuit. For at least one embodiment, the power converter provides a first resistive element of the voltage divider circuit and the device provides a second resistive element of the voltage divider circuit. For at least one embodiment, the voltage divider circuit is formed when the device is electrically connected to the power converter such that a first voltage potential is formed when the power converter is not electrically connected to the device and a second voltage potential is formed when the power converter is electrically connected to the device.

For at least one embodiment, the secondary controller is configured for use with an electrical circuit formed with the device. For at least one embodiment, the electrical circuit includes a detecting circuit configured to detect the formation of an electrical connection between the device and the power converter. For at least one embodiment, the electrical circuit includes a signaling circuit configured to operate a device switch, wherein upon closure of the device switch a device battery provides electrical power to the secondary controller. For at least one embodiment, at least one of the detecting circuit and the signaling circuit are provided by the device.

For at least one embodiment of the present disclosure, a primary controller for use with a power converter comprises an IMIN controller configured to control currents output by a power converter during standby mode, powered mode, and transitions from the standby mode to the powered mode.

For at least one embodiment, an IMIN controller comprises a low voltage dominant bypass circuit configured to compare the currents provided in a feedback signal against a peak current threshold and output the lesser of the compared signals.

For at least one embodiment, an IMIN controller comprises a high voltage dominant bypass circuit configured to second compare the output of the low voltage dominant bypass circuit with a selected output current level and output the higher of the second compared signals.

For at least one embodiment, an IMIN controller comprises a selector configured to detect an electrical connection of a device to the power converter. For at least one embodiment, the connection is detected based upon a rapid variation in the feedback signal or the primary voltage signal in a third coil of the transformer. For at least one embodiment, an IMIN controller comprises a selector configured to select between a first IMIN level and a second IMIN level. For at least one embodiment, the first IMIN level is less than the second IMIN level. For at least one embodiment, the selector selects the first IMIN level when a device is electrically connected to the power converter. For at least one embodiment, the selector selects the second IMIN level when a device is not electrically connected to the power converter.

BRIEF DESCRIPTION OF THE DRAWINGS

The features, aspects, advantages, functions, modules and components of the apparatus, systems and methods provided by the various embodiments of the present disclosure are further disclosed herein regarding at least one of the following descriptions and accompanying drawing figures.

FIGS. 9A-9B are timing diagrams illustrating representative voltages and currents detected by a primary current control circuit for respective $I_{MIN1}$ and $I_{MIN2}$ settings in accordance with at least one embodiment of the present disclosure.

DETAILED DESCRIPTION

The various embodiments described herein are directed to apparatus, systems, and methods for controlling standby power and transitioning to a power mode of operation in power converters. More specifically, the embodiments described herein are directed to methods, systems, and apparatus for controlling transitions between standby and power modes in switch mode operated power converters. The embodiments described herein may find use in electronic devices, such as power converters configured for use with personal communications devices, such as mobile phones and tablets, and with other devices whose requests for voltages and currents provided by a power converter vary over time including periods of time when the device is either not connected to the power converter or a load request is not then pending. While the various embodiments set forth herein, and as shown in the attached drawing figures, provide sufficient information for a person of ordinary skill in the art to practice one or more of the inventions, as claimed herein or as later claimed in any application claiming priority to this disclosure, it is to be appreciated that one or more embodiments may be practiced without one or more of the details provided herein. As such, the various embodiments described herein are provided by way of example and are not intended and should not be used to limit the scope of any invention claimed to any embodiment.

Figure 1:
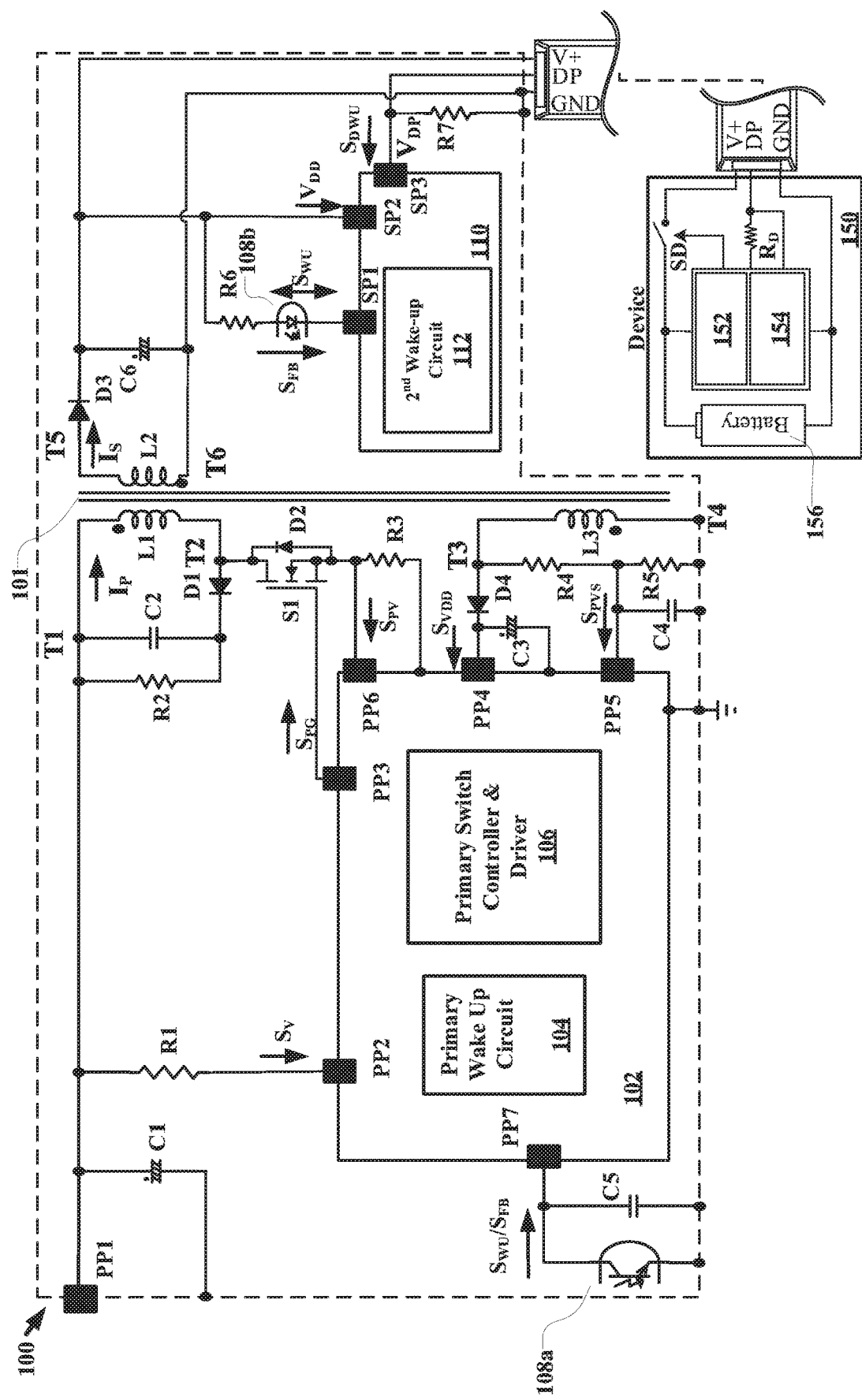
FIG. 1 is schematic representation of an electrical circuit for controlling the awakening of a power converter from standby mode to powered mode in accordance with a first embodiment of the present disclosure.

As shown in FIG. 1 and for at least one embodiment of the present disclosure, a power converter 100 having a primary side and a secondary side is provided. The power converter 100 may be configured to include a transformer 101 having a first coil L1, a second coil L2 and a third coil L3. The first coil L1 and third coil L3 being located on the primary side of the power converter 100 and of the transformer 101. The second coil L2 being located on the secondary side of the power converter 100 and transformer 101.

Primary Side of Power Converter

First Coil: The first coil L1 includes a first terminal T1 suitably connected to a first primary port PP1 which, in at least one embodiment, functions as a primary input power port configured to receive input voltages and currents from a power source (not shown). The power source may be an alternating current (AC) source whose input signal is suitably rectified into a direct current (DC) source, a DC power source, or otherwise. Input power signal conditioning may be provided using capacitors C1 and C2 and resistor R2 which are connected in parallel to the first terminal T1. Power converter 100 may include diode D1 which is connected to a second terminal T2 of the first coil L1 and configured to prevent reverse biasing of first coil L1. Resistor R1 may also be provided and is connected to the first terminal T1 to provide a primary controller 102, via a second primary port PP2, with a primary input voltage signal $S_V$ which is a representation of the input voltages provided by the power source to the first coil L1. The components, connectivity and signals used by the primary controller 102 are discussed in greater detail below.

First Switch: A first switch S1 is connected to the second terminal T2 of the first coil L1. In at least one embodiment, the first switch S1 is a MOSFET with the drain being connected to the second terminal T2. It is to be appreciated that in other embodiments, other configurations and or arrangements of switching components, including MOSFETS or otherwise, may be utilized as desired for any implementation. A diode D2 represents the body diode of MOSFET S1.

The gate of the first switch S1 is connected to a third primary port PP3 of the primary controller 102. The primary controller 102 is configured to output, via the third primary port PP3, the primary gate control signal $S_{PG}$. $S_{PG}$ controls the duration (pulse width) and frequency during which the first switch S1 is "on" and "off." A primary current $I_P$ is generated through the first coil L1 during each turn-on period of S1.

The source of the first switch S1 is connected to a resistor R3 which is also connected to ground. When the first switch S1 is "on", the current sensing voltage signal $S_{PV}$ is generated and represents the voltage across the resistor R3. When the first switch is "on," a primary current $I_P$ flows from the power source and through the first coil L1, the first switch S1 and resistor R3 to ground. The current sensing voltage signal $S_{PV}$ is provided to the primary controller 102 via a sixth primary port PP6.

Third Coil: The power converter 100 and transformer 101 also includes a third coil L3. The third coil L3 includes a third terminal T3 and a fourth terminal T4 which is grounded. The third terminal T3 is connected to the primary controller 102 via diode D4 and the fourth primary port PP4. The third terminal T3 is also connected to the primary controller 102 via a first voltage divider circuit formed by resistors R4 and R5 and the fifth primary port PP5. The third coil L3 provides to the primary controller 102 two signals representative of the voltages and currents transferred by the first coil L1, as represented by voltages and currents generated in the third coil L3, during each duty cycle of the power converter 100. More specifically, the third coil L3 generates and provides an applied voltage signal $S_{VDD}$ to the primary controller 102 via the fourth primary port PP4. $S_{VDD}$ is generated by the third coil L3 and represents the voltages and currents generated by the transformer 101 over each duty cycle. Second, the third coil L3 generates and provides a scaled primary voltage signal $S_{PVS}$ to the primary controller via the fifth primary port PP5 over each duty cycle. $S_{PVS}$ is a scaled representation of the voltage across the third coil L3 proportional to the voltage across the second coil L2. Diode D4 and capacitors C3 and C4 provide rectifying and filtering for the $S_{VDD}$ and $S_{PVS}$ signals.

Opto-Coupler: The power converter 100 also includes an opto-coupler 108a-b which includes a receiving element 108a on the primary side and a transmitting element 108b on the secondary side. For at least one embodiment, the opto-coupler 108a-b is configured to transmit to the primary side both a wake-up signal $S_{WU}$ and a feedback signal $S_{FB}$. Each of these signals, which depend on mode of operation in an output controller 110 (described further below), are transmitted by the secondary side to the primary controller 102 via the opto-coupler 108a-b and the seventh primary port PP7 of the primary controller 102. Capacitor C5 provides conditioning for the received $S_{WU}$ or $S_{FB}$ signal. It is to be appreciated that only one of the $S_{WU}$ or $S_{FB}$ signal is typically transmitted from the secondary side to the primary side at any given time by the opto-coupler 108a-b. In accordance with at least one embodiment, a distinction between the $S_{WU}$ and $S_{FB}$ signals may be provided in terms of any form of analog or digital signal characteristic, such as voltage, current, duration, polarity, one or more pulses, or sequences thereof, or otherwise. As discussed below, the $S_{WU}$ signal represents a signal instructing the primary side to power-up from standby mode. $S_{WU}$ is transmitted to the primary side when a transition from standby mode to powered mode is requested by the output controller 110. During powered mode, the $S_{FB}$ signal corresponds to the output power provided by the power converter 100 to the adaptive device 150. The primary controller 102 may use the $S_{FB}$ signal to control the output power provided by the power converter 100 to the adaptive device 150.

It is to be appreciated that other signal representations, in the analog and/or digital domains, may be used to represent and transmit information from an adaptive device 150 and/or the output controller 110 to the primary controller 102 via one or more opto-couplers.

Primary Controller: The primary controller 102 includes various components configured to awaken the primary side from a standby mode configuration and, during powered mode, to control the output voltage, and when desired, the output power, of the power converter 100 based on communications received from the secondary side and/or from an adaptive device 150 connected to the secondary side. The components used for operations performed by the primary controller 102 may be provided in one or more integrated circuit assemblies and may include the use of commonly known circuit elements including, but not limited to, logical, discrete elements, active and passive elements. In accordance with at least one embodiment, the primary controller 102 includes a primary wake-up circuit 104 and a primary switch controller and driver circuit 106. Other components may be included in the primary controller 102, as desired for any given implementation of one or more embodiments of the present disclosure. For at least one embodiment, during standby mode, the primary switch controller and driver circuit 106 is powered down.

Primary Wake-up Circuit 104: As shown in FIG. 1, the primary controller 102 may include a primary wake-up circuit 104 which, for at least a first embodiment, includes one or more components configured to instruct the primary controller 102 and the primary switch controller and driver circuit 106 to activate and begin converting the input power received at the first port PP1 into the output voltages and currents desired by the adaptive device 150. The primary wake-up circuit 104 is suitably connected to one or more ports of the primary controller 102. The primary wake-up circuit 104 is powered during standby mode at a minimal level necessary for it to receive and respond to a wake-up signal received from the secondary controller, as described further below. It is to be appreciated that the minimal power level used will vary by implementation, but, for at least one embodiment is less than a few milliwatts. In at least one first embodiment, the primary wake-up circuit 104 is suitably connected to the seventh primary port PP7, via which the primary controller 102 receives the $S_{WU}$ signal. Upon receipt of $S_{WU}$, the primary wake-up circuit 104 may be configured to instruct the primary switch controller and driver circuit 106 to close the first switch S1 and begin the powering up operations of the primary side of the power converter 100. It is commonly appreciated that a switch mode power supply commonly undergoes a transition period during which the output power provided by the power converter is stabilized until a desired substantially constant output voltage and current is generated. During this transition period, the primary controller 102 may be configured to begin recognizing that the signal received at PP7 is the feedback signal $S_{FB}$, which the primary controller 102 may use to adjust and control the output power of the power converter 100.

Primary Switch Controller & Driver 106: The primary controller 102 also may be configured to include a primary switch controller and driver circuit 106 configured to control the opening and closing of the first switch S1 based on signals received on the various ports of the primary controller 102 including, but not limited to, the feedback signal $S_{FB}$ and, in the case of the second embodiment of FIG. 3, the $S_{PVS}$ signal. The operation and configuration of the primary switch controller and driver circuit 106 may use any suitable design, such designs being well known in the art.

Secondary Side of Power Converter

Second Coil, L2: The secondary side of the power converter 100 includes the before mentioned second coil L2 which has a fifth terminal T5 and a sixth terminal T6. As shown in FIG. 1, fifth terminal T5 is suitably connected to diode D3 which is connected in parallel to the adaptive device 150, signal conditioning capacitor C6, and to sensing resistor R6. The second coil L2 generates the second current $I_S$ during each duty cycle. Voltage across capacitor C6 is supplied to an output controller 110 via a second secondary port SP2.

The sensing resistor R6 is connected in series to a cathode of diode D3 and the transmitting element 108b of the opto-coupler 108a-b. During powered mode operations, sensing resistor R6 senses the output voltage provided by the second coil L2 to the adaptive device 150. The feedback signal $S_{FB}$ is transmitted to the primary controller 102 via the opto-coupler 108a-b. The feedback signal $S_{FB}$ is also transmitted to the output controller 110 via a bi-directional first secondary port SP1.

Output controller: The output controller 110 includes a secondary wake-up circuit 112 that is communicatively coupled to the first secondary port SP1. The output controller 110 also includes the second secondary port SP2 which provides power to the output controller 110. During powered mode, the power is provided by the voltage and current induced by transformer 101 in the second coil L2. During standby mode and upon the receipt of a request by a device 150 for power from the power converter, power to the output controller 110 is provided by battery 156 in the adaptive device 150 via the circuit formed with the closing of device switch SD. As discussed below, when a transition is requested from standby mode to powered mode, the device 150 is configured to close switch SD, upon which an electrical circuit is configured between battery 156 and output controller 110.

The output controller 110 also includes a third secondary port SP3 that can be communicatively coupled to device 150 such that one or more instructions may be communicated by device 150 to output controller 110. In at least one embodiment, secondary port SP3 is a bi-directional port facilitating the communication of information signals by and between power converter 100 and device 150. In at least another embodiment, secondary port SP3 is unidirectional and supports the communication of information signals from device 150 to power converter 100. Third secondary port SP3 may receive, from device 150, a device wake-up signal $S_{DWU}$. $S_{DWU}$ may be used to instruct power converter 100 to transition from standby mode to powered mode. $S_{DWU}$ may be generated by device 150 upon establishment of an electrical connection between device 150 and power converter 100, or at any time thereafter. In accordance with at least one embodiment, device 150 may be configured to periodically send $S_{DWU}$ to power converter 100 to maintain a trickle or other charge on battery 156. During such periodic charging, power converter 100 may be configured to transition from standby to powered to standby mode repeatedly and thereby minimize energy use during periods when the device 150 is not otherwise needing power from the power converter 100.

Figure 2:
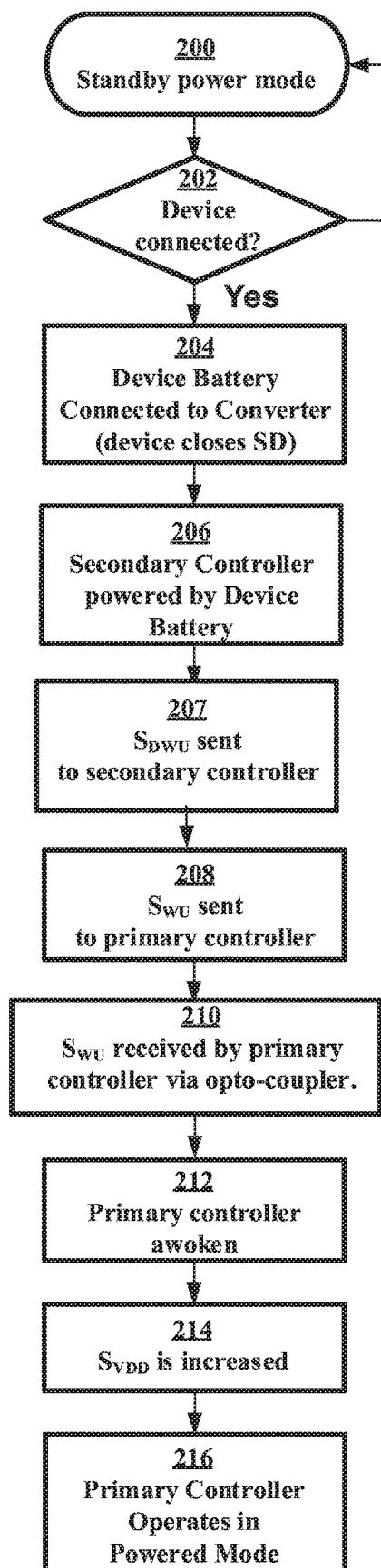
FIG. 2 is a flow chart representation of a method for awakening a power converter from standby mode to powered mode in accordance with the first embodiment of the present disclosure.

Referring now to FIG. 2, one embodiment of a method for transitioning a power converter from standby mode to powered mode is shown. Per Operation 200, this method begins when power converter 100 enters standby mode and continues while the converter remains in standby mode. As discussed above, power converter 100 may enter standby mode based upon any of many events. For example, when device 150 is disconnected from power converter 100, the drop in the secondary current $I_S$, will be reflected by a corresponding change in the primary current $I_P$, with such change being detectable via the third coil L3, and represented in either of the applied voltage signal $S_{VDD}$ or the scaled primary voltage signal $S_{PVS}$. It is to be appreciated, that in certain embodiments the change in $I_P$ may be more readily detectable using the scaled primary voltage signal $S_{PVS}$. Similarly, operation 200 occurs when the load requested by a device 150 is zero for one or more duty cycles. As discussed above, a device 150 may be configured to determine when it is fully charged but remains connected to power converter 100. Upon determination of such a state, the device 150 may be configured to open switch SD, which opens the circuit between battery 156 and power converter 100. Upon opening switch SD, the secondary current $I_S$ will fall rapidly, while the output voltage is maintained at a constant voltage by the power converter 100. Additionally, device 150 may be configured to communicate to output controller 110 an inverse of the $S_{DWU}$ signal, such inverse signal may be represented in an analog or digital format and may be configured to instruct the power converter 100 to enter standby mode.

In Operation 202, the process continues with a determination of whether a device is connected. It is to be appreciated, that in accordance with at least one embodiment where standby mode is entered when device 150 is disconnected and the transformer 101 shortly thereafter is no longer inducing voltages and currents in the second coil L2, operations 200 and 202 are conducted after device 150 is connected to the power converter 100. For such a scenario, the output controller 110 is typically unpowered until a device is again connected to the power converter. When a device 150 is again connected to the power converter 100, the arbitrary device voltage potential $V_{DP}$ at the third secondary port SP3 may be detected corresponding to the ratio between $R_D$ and R7 of a voltage divider circuit. That is, via the $V_{DP}$ signal, power converter 100 may determine whether device 150 is connected even when device switch SD is open. It is to be appreciated that the voltage changes needed by the output controller 110 to detect a change in the $V_{DP}$ signal representing the attaching of device 150 to the power converter 100 may be less than a few milliwatts.

In Operation 204, the transition from standby mode to powered mode may occur with the closing of the device switch SD. By closing SD, battery 156 provides power to output controller 110 via the second secondary port SP2 (as per Operation 206).

Per Operation 206, the output controller 110 is now powered by the battery 156. During this state and for at least one embodiment, the output controller 110 may be configured to prevent the powering of the transmitting element of the opto-coupler 108b by not grounding the first secondary port SP1. While not shown in FIG. 1, it is to be appreciated that for at least one embodiment, the secondary wake-up circuit 112 may be configured to control the flow of electrical currents through the first secondary port SP1 and, thereby, thru the transmitting element of the opto-coupler 108b. For one such configuration, current may be allowed to flow through the transmitting side of the opto-coupler 108b after receipt of a device wake-up signal $S_{DWU}$ via the third secondary port SP3 of the output controller 110 (per Operation 208). It is to be appreciated that such an embodiment may configure the power converter 100 for transitioning from standby mode to powered mode to occur after the output controller 110 has been powered or has otherwise reached a stable operating state. In other embodiments, the secondary wake-up circuit 112 may be configured to automatically close a circuit connected to the transmitting element of the opto-coupler 108b such that upon closing of the device switch SD, the transmitting side 108b communicates the $S_{WU}$ signal to the receiving side 108a of the opto-coupler without requiring the device 150 to separately send the device wake-up signal $S_{DWU}$.

In another embodiment, the device 150 may be configured to include a signaling circuit 152 and a detecting circuit 154. The detecting circuit 154 may be configured to detect the connection between the power converter 100 and device 150. When connecting the power converter 100 to device 150, the signaling circuit 152 may be configured to close the device switch SD to power the output controller 110 so that a transition from standby mode to powered mode may occur in the output controller 110. Per at least one embodiment, the device switch SD may be temporarily closed, as instructed by signaling circuit 152, such that an electrical signal of sufficient time and duration is provided that awakens the output controller 110. Upon closing of the device switch SD, the signaling circuit 152 may be configured to then send the device wake-up signal $S_{DWU}$ to the output controller 110 via the third secondary port SP3 (Operation 207). The device wake-up signal $S_{DWU}$ may then be provided to the secondary wake-up circuit 112, which activates the transmitting element of the opto-coupler 108b and thereby communicates the wake-up signal $S_{WU}$ to the primary side of the power converter 100. Accordingly, in FIG. 1, the wake-up signal $S_{WU}$ is shown to be bi-directional, although it is to be appreciated that it is typically used with only one direction of current flow, as per a given implementation of the one or more described embodiments.

As discussed above and as represented by Operation 208, the wake-up signal $S_{WU}$ is transmitted to the primary controller 102. As per Operation 210, the wake-up signal $S_{WU}$ is received by the primary controller by the receiving element of the opto-coupler 108a. Next, per Operation 212, the primary controller 102 is awoken and automatically begins stabilizing its operations for powered mode. As per Operation 214, after transitioning from standby mode to powered mode, the supply voltage signal $S_{VDD}$ will increase to voltage level to operate the primary controller 102 via input voltage of the first port PP1, resistor R1 and the second primary port PP2. After the primary controller is operated by the increase of the supply voltage signal $S_{VDD}$, the power converter 100 starts to provide the power to the device 150 under the closing of the device switch SD. In another embodiment, upon opening of the device switch SD after receipt of a device wake-up signal $S_{DWU}$ via the third secondary port SP3 of the output controller 110 (per Operation 208), the output voltage $V_{DD}$ that the power converter 100 may provide to the device 150 will also increase. In at least one embodiment, these increases in $V_{DD}$ may be communicated by the output controller 110 to the device 150 via the third secondary port SP3. Upon the output voltage $V_{DD}$ reaching a desired threshold, the device 150 may be configured to again close the device switch SD and thereby power the device and/or charge the battery 156 using the power provided by the power converter 100. In another embodiment, the device 150 may be configured to close the device switch SD after a given amount of time has elapsed since the device wake-up signal $S_{DWU}$ was sent by the device 150 to the power converter 100.

In operation 216, the primary controller 102 is operated according to steady-state parameters and provides electrical power to the device 150 until the next transition to standby mode occurs.

Output Switch Controlled Power Converter Embodiment

Figure 3:
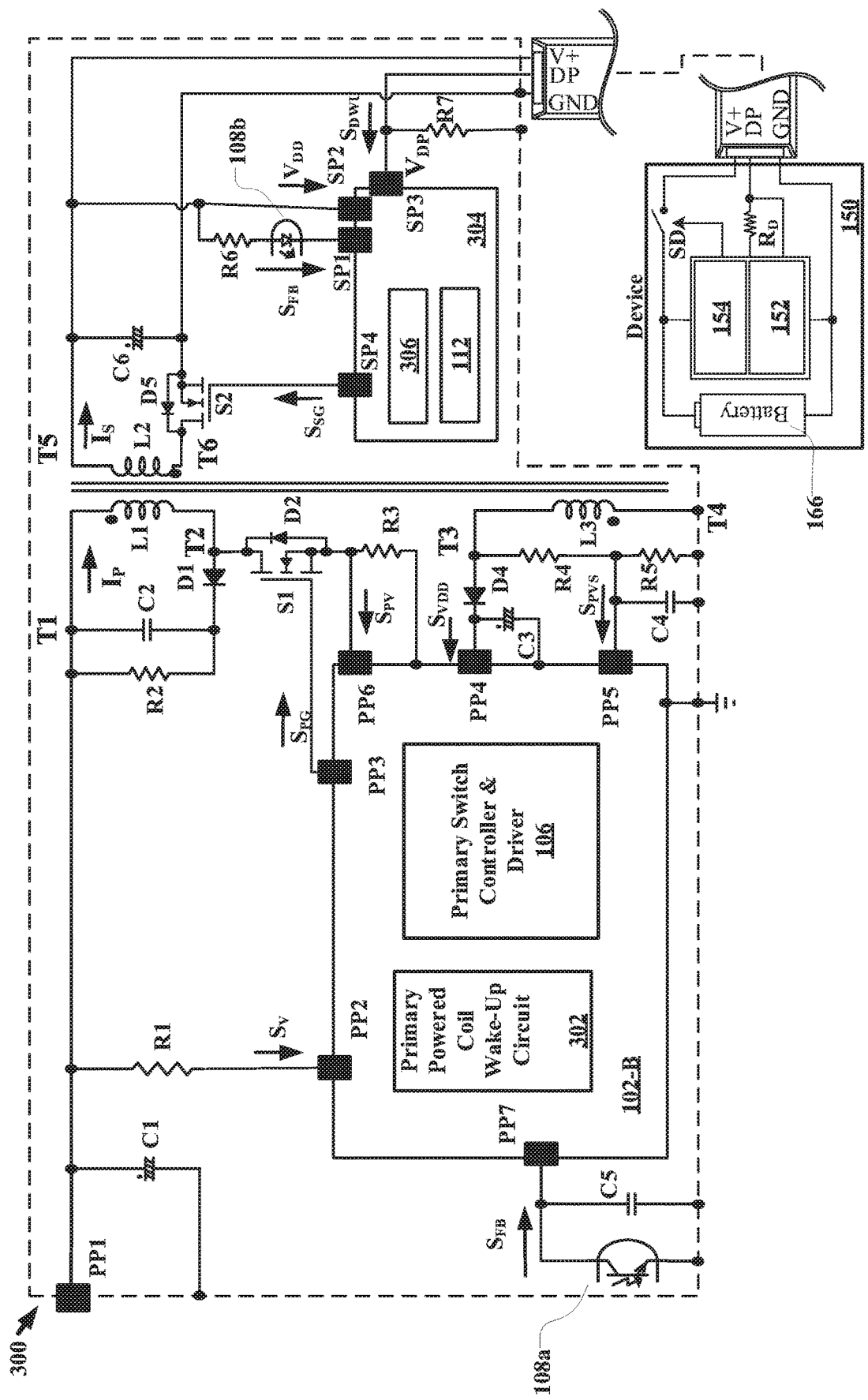
FIG. 3 is a schematic representation of an electrical circuit for controlling the awakening of a power converter from standby mode to powered mode in accordance with a second embodiment of the present disclosure.

In FIG. 3, a second embodiment of a power converter 300 is shown. For this embodiment, the secondary side includes a second switch S2 that may be used to control the duty cycle for the second coil L2 (herein, the "second duty cycle"). In FIG. 3, elements common to the embodiments described with respect to FIG. 1 are configured and operate the same, unless otherwise further described herein.

As shown in FIG. 3, primary controller 102-B includes a primary switch controller and driver 106 and a primary powered coil wake-up circuit 302. Primary controller 102-B is configured to receive the $S_V$, $S_{PV}$, $S_{VDD}$, $S_{PVS}$, and $S_{FB}$ signals and send the $S_{PG}$ signal via ports PP1-PP7. Primary powered coil wake-up circuit 302 differs from the primary wake-up circuit 104 in that it is not configured to receive or awaken the primary controller 102 upon receipt of a wake-up signal $S_{WU}$ sent by the output controller 110 via the opto-coupler 108a-b for the embodiment of FIG. 1. Instead, per the embodiment of FIG. 3, the opto-coupler 108a-b is not used to send a wake-up signal $S_{WU}$ to the primary controller 102.

Upon the generation of a scaled primary voltage signal $S_{PVS}$ by the third coil L3, due to the powering of the second coil L2 by the battery 156 of the device 150, the primary powered coil wake-up circuit 302 detects the scaled primary voltage signal $S_{PVS}$ induced in the third coil L3 and activates the primary controller 102-B. It is to be appreciated that either the applied voltage signal $S_{VDD}$ or the scaled primary voltage signal $S_{PVS}$, with the latter providing greater sensitivity but less power to the primary controller 102-B, may be utilized to signal the primary powered coil wake-up circuit 302 to transition the primary controller 102-B from standby mode to powered mode. It is to be appreciated that using voltage induced in the third coil L3 from the second coil L2 by the battery 156, the primary controller 102-B may be configured to detect and interpret as a request by the device 150 to transition from standby mode to powered mode.

As further shown in FIG. 3, the second coil L2 is connected via the sixth terminal T6 to a secondary switch S2. In at least one embodiment, the secondary switch S2 is a MOSFET with the drain being connected to the sixth terminal T6. It is to be appreciated that in other embodiments, other configurations and or arrangements of switching components, including MOSFETS or otherwise, may be utilized as desired for any implementation. A diode D5 represents the body diode of MOSFET S2. The drain of the secondary switch S2 is connected to sixth terminal T6, the source is connected to ground, and the gate is connected to a second output controller 304 via a fourth secondary port SP4.

During powered mode of operation, the conduction loss of diode D5 may be reduced by controlling the second duty cycle. The second duty cycle may be controlled by the second output controller 304 via a secondary gate signal $S_{SG}$. More specifically and per at least one embodiment of the present disclosure, a secondary switch controller 306 is communicatively coupled, via the second secondary port SP2 to the gate of the second switch S2. The secondary switch controller 306 generates the secondary gate signal $S_{SG}$, which is used to control the second duty cycle and thereby the reduced conduction loss of the power converter 300 during powered mode. Secondary switch S2 may be used in one or more embodiments to reduce conduction losses, as desired for any given implementation.

The secondary switch controller 306 may also be used during standby mode to signal the primary controller 102-B that a transition from standby mode to powered mode has been requested by the device 150. As discussed above, for at least one embodiment, by controlling the status (open/closed) of the device switch SD and the second switch S2, a circuit may be formed by which the battery 156 of the device 150 generates voltage across the second coil L2, which induces voltage across in the third coil L3. The primary powered coil wake-up circuit 302 may be configured to determine that a transition is desired from a standby mode to a powered mode based upon the generation of such voltage across the third coil L3. This voltage may be represented in one or more of the applied voltage signals $S_{VDD}$ and the scaled primary voltage signal $S_{PVS}$.

The second output controller 304 may be configured to generate the second gate signal $S_{SG}$ upon receipt of the device wake-up signal $S_{DWU}$, upon receipt of an output voltage $V_{DD}$ generated by the battery, for example, upon the closing of device switch SD, or otherwise.

Figure 4:
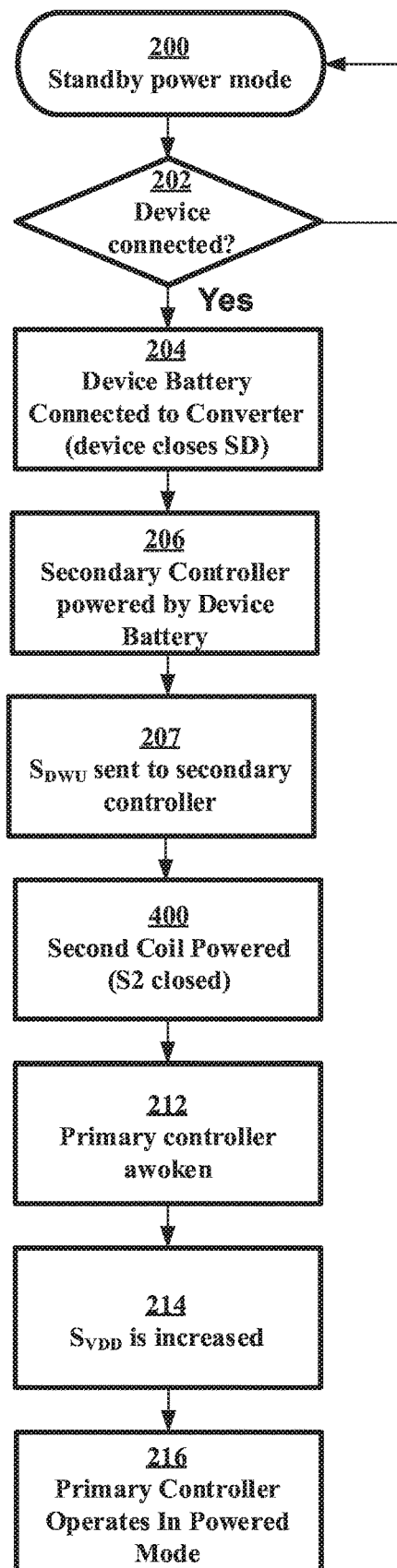
FIG. 4 is a flow chart representation of a method for awakening a power converter from standby mode to powered mode in accordance with the second embodiment of the present disclosure.

In FIG. 4, a method for using the second power converter 300 to control transitions from standby mode to powered mode is shown. The method includes Operations 200, 202, 204, 206, and 207 which proceed as discussed above. Per Operation 400, upon receipt of the device wake-up signal $S_{DWU}$ the secondary switch controller 306 closes the second switch S2, thereby applying voltage of the battery 156 across the second coil L2. As discussed above, this voltage induces corresponding voltage across the third coil L3, which generates the applied voltage $S_{VDD}$ and the scaled primary voltage $S_{PVS}$ signals used to awaken the primary controller. The transition to powered mode then continues with operations 212, 214, and 216 as discussed above.

Compensated Power Converter Embodiment

Figure 5:
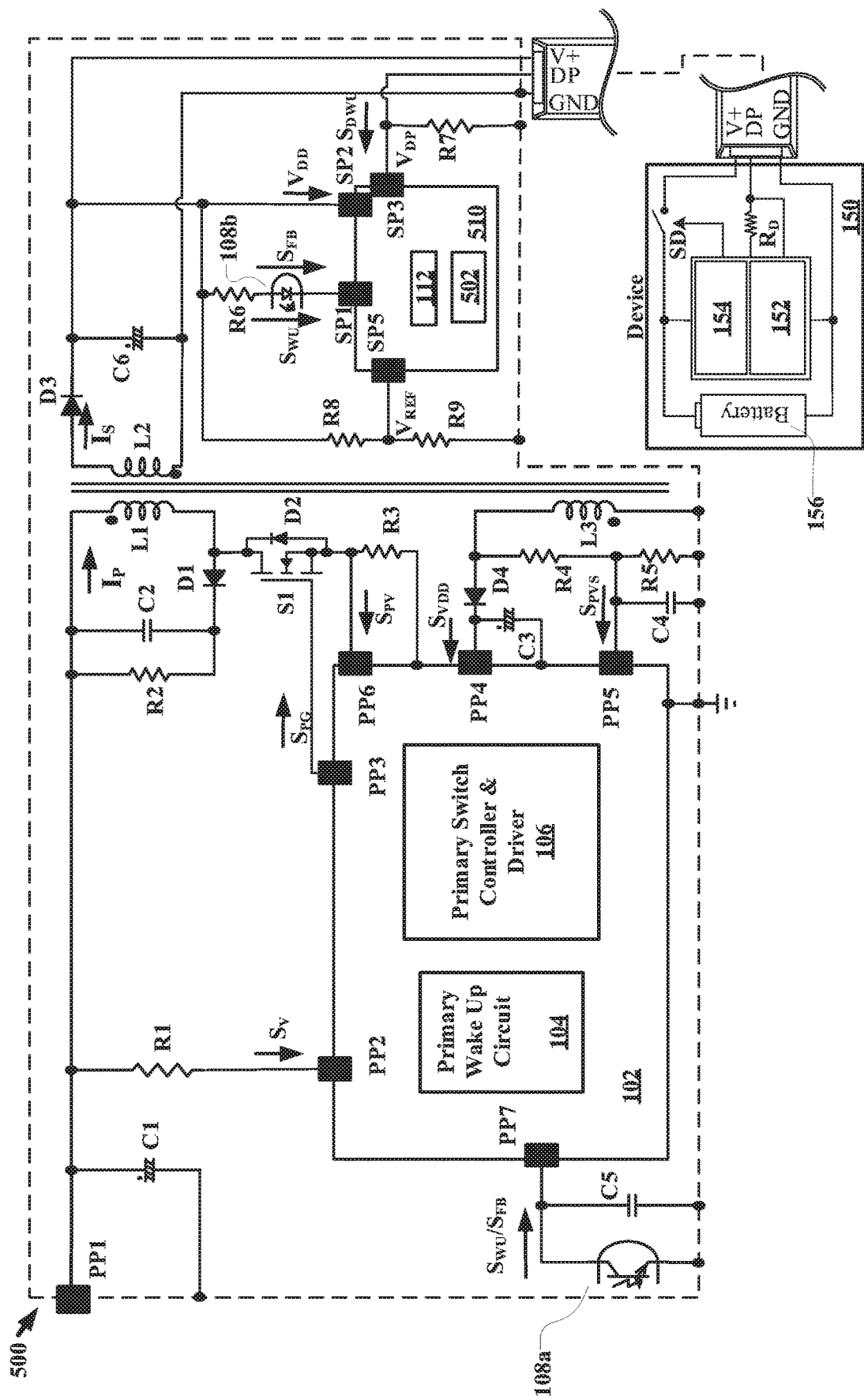
FIG. 5 is a schematic representation of an electrical circuit for controlling the awakening of a power converter from standby mode to powered mode in accordance with a third embodiment of the present disclosure.

Referring now to FIG. 5, a third power converter 500 configured to transition from standby mode to powered mode is shown, wherein the primary side of the power converter remains powered during standby mode operations. Per this embodiment, during standby mode the primary controller 102 controls the primary side of the power converter 500 such that the no-load output voltage is maintained between 3-7 volts, for example. It is to be appreciated, that such a mode of operation may result in large output ripples being generated in the output voltage when a device 150 is disconnected from the power converter 500. To control such ripples and other dynamic characteristics of the power converter when in standby mode, a third output controller 510 is configured to slowly respond to such fluctuations in the output voltage. As shown, the third power converter 500 may be configured to include a voltage divider circuit including resistors R8 and R9 that generate a reference voltage signal $V_{REF}$. $V_{REF}$ is provided, via a fifth secondary port SP5, to a compensator circuit 502 provided in a third output controller 510. The compensator circuit 502 may be configured to detect and control fluctuations in the output voltage using any desired technique or approach.

Further, for at least one embodiment, the device wake-up signal $S_{DWU}$ may be utilized to instruct the power converter 500 to transition to powered mode. Such transition occurs as discussed above with respect to the first embodiment and the first flow, with the exception that the third output controller 510 does not utilize power from the battery 156 to perform the transition. Instead, the third output controller 510 remains powered by the currents induced in the second coil L2 by the primary coil L1. It is to be appreciated that the faster compensator 600 is configured to respond to ripples in the output voltage, $V_{DD}$ generally increases standby power correspondingly. Contrarily, if the response of the compensator 600 is slow, standby power may be reduced, but output ripples and other undesired characteristics in the output voltage may be generated.

Figure 6:
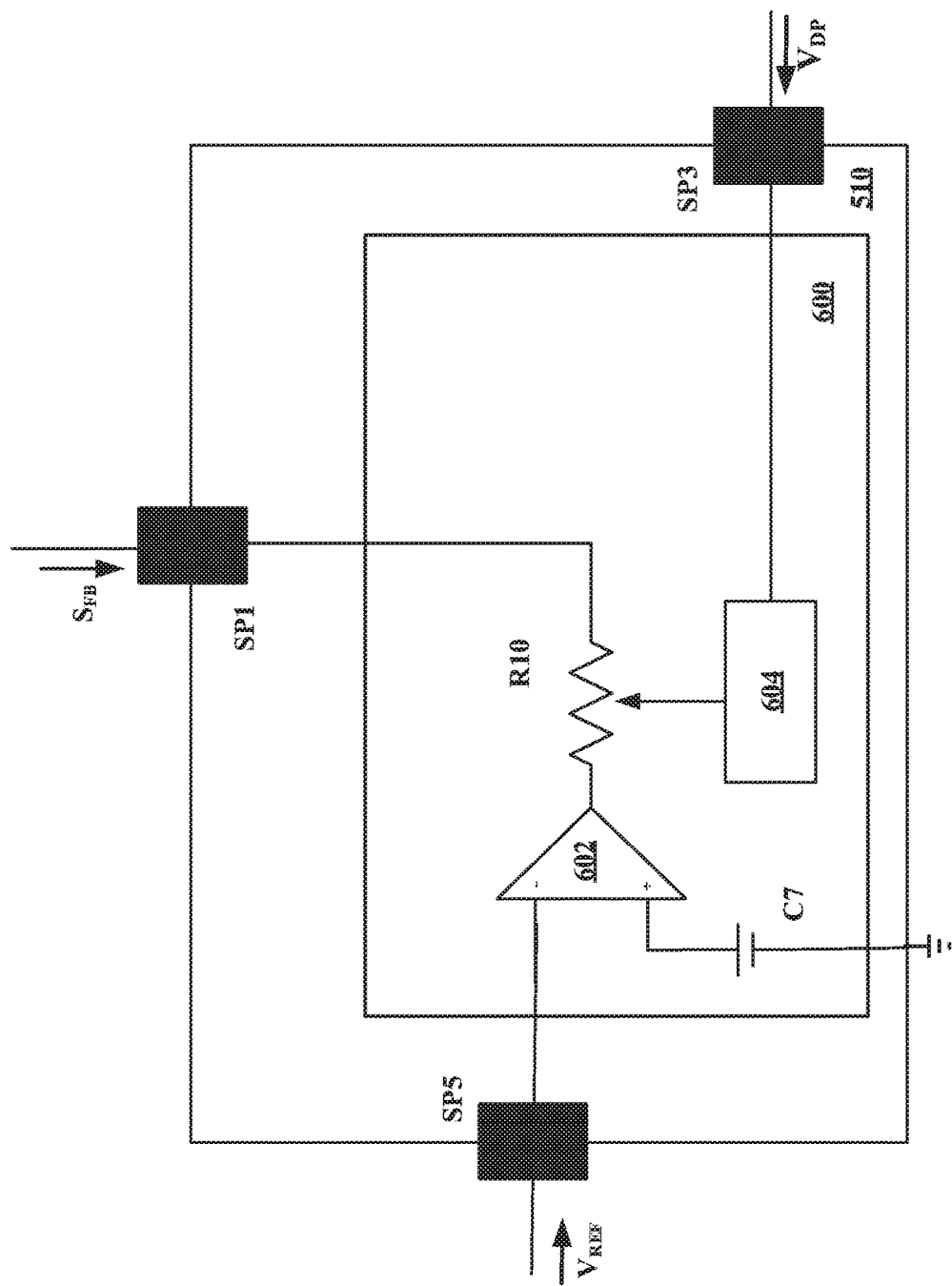
FIG. 6 is a schematic representation of an electrical circuit for controlling the awakening of a power converter from standby mode to powered mode in accordance with a fourth embodiment of the present disclosure.

Given these concerns, in FIG. 6, one embodiment is shown of a compensator circuit 600 which can automatically adjust to fluctuations in the output voltage to achieve a desired response. The compensator circuit 600 may be provided in a third power converter 500 configured to receive and send, as discussed above, the $S_{DWU}$, $V_{DP}$, $V_{REF}$, $V_{DD}$, $S_{FB}$, and $S_{WU}$ signals (for purposes of simplifying this description, all ports and signals received and/or sent by third output controller 510 are not shown in FIG. 6). The compensator circuit 600 may include a amplifier 602 configured to receive the $V_{REF}$ signal, compare such signal to a set threshold as specified by the voltage of capacitor C7, and output a compared reference voltage. Voltage of capacitor C7 may be set based upon observed responses of the power converter to a range of output voltages, based on mathematical analysis or otherwise. Compensator circuit 600 also includes an attachment detector 604 configured to receive the $V_{DP}$ signal which, as discussed above can be used to detect the attachment of a device to the power converter. The attachment detector 604 is configured to control the resistance of resistor R10 based upon whether a device is or is not attached to the power converter. Per at least one embodiment, the resistance of resistor R10 is decreased when a device is attached and the resistance is increased when a device is detached. These changes in resistance are communicated in the feedback signal $S_{FB}$ which the primary controller 102 may utilize to control the operation of the first switch S1 and, thereby, the power converter during standby mode to utilize as little power as necessary.

Per at least one embodiment, the compensator 600 may be configured such that before a device is attached to the power converter, the resistance R10 is set very large and the response of the compensator to changes in the output voltage, as represented by $V_{REF}$, may be very slow. It is to be appreciated, that the larger the resistance R10 utilized, the less power is wasted during standby mode. After a device is attached, as detected for at least one embodiment by a change in the $V_{DP}$ signal, the resistance may be set to very small, with a very fast response. It is to be appreciated that other permutations of resistances may be utilized to tune a power converter to provide a given response rate in view of power consumed during standby mode operations.

Controlled Minimum Primary Current Embodiment

Figure 7:
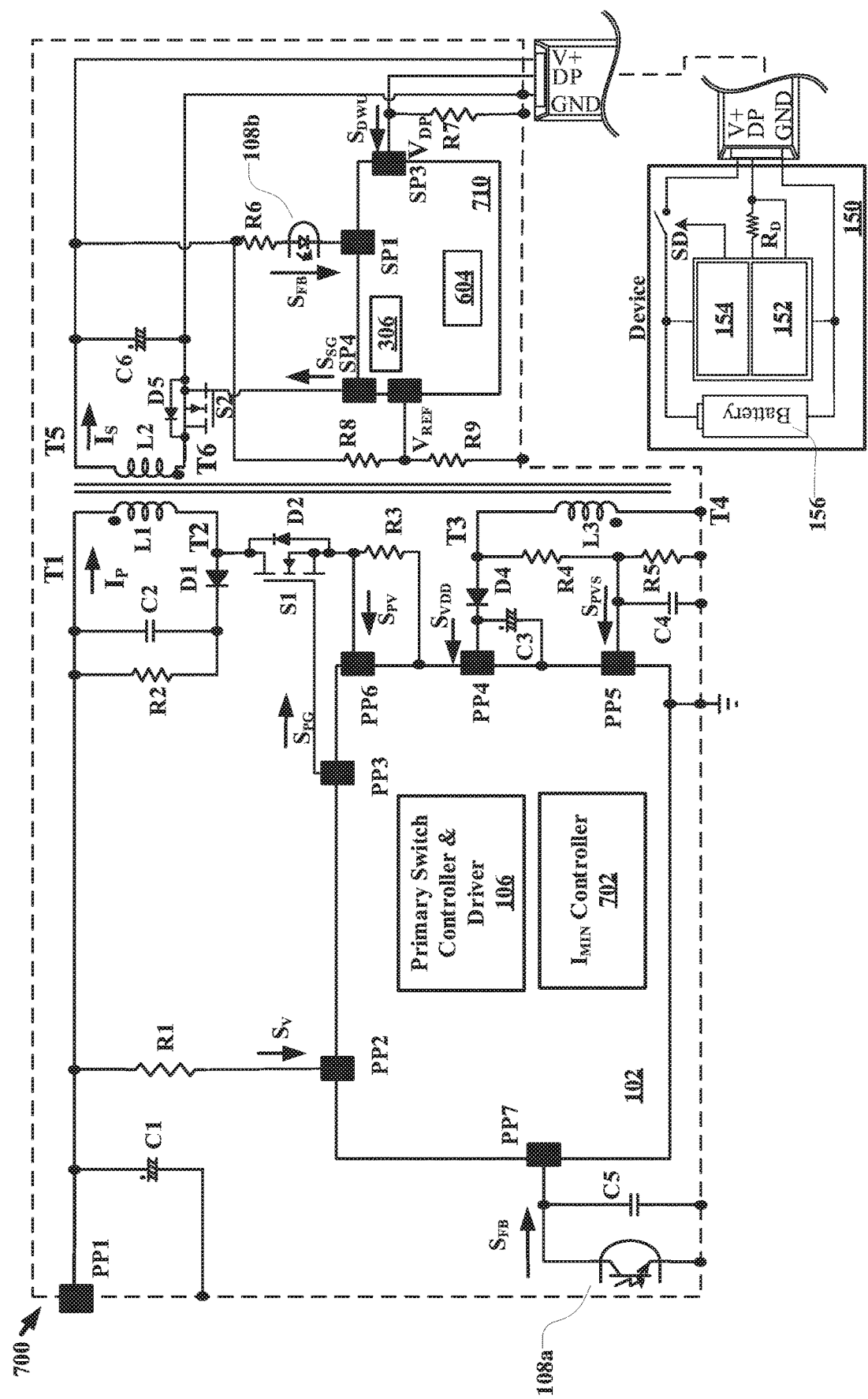
FIG. 7 is a schematic representation of an electrical circuit for controlling the awakening of a power converter from standby mode to powered mode in accordance with a fifth embodiment of the present disclosure.

In FIG. 7, a fourth embodiment 700 of a power converter configured to minimize power losses during standby mode and automatically transition from standby mode to powered mode is shown. Per this embodiment and like one or more of the embodiments described above, such as by example the embodiment of FIG. 5, during standby mode the primary controller may remain powered and the output voltage may be maintained between a desired range. It is to be appreciated, however, that during standby mode occasional activations of the primary coil, by controlling the status of the first switch, may be used to maintain the output voltage between the desired range. Per at least the embodiment of FIG. 7, these operations and transitions between standby and powered modes may be further controlled by use of an $I_{MIN}$ controller 702, which for at least one embodiment is configured for use on the primary side of the power converter 700.

Figure 8:
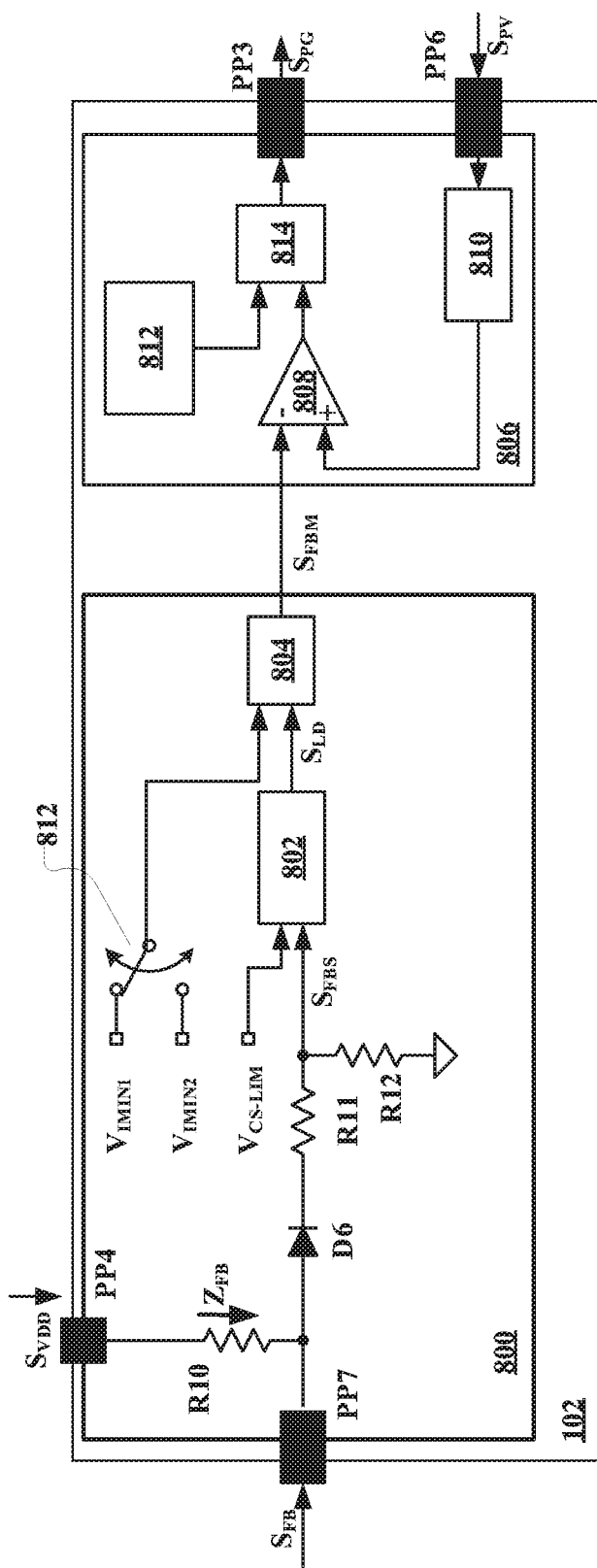
FIG. 8 is a schematic representation of a primary current control circuit for use in determining the mode of operation of a power controller in conjunction with at least one embodiment of the present disclosure.

More specifically, as shown in FIG. 8, primary controller 102 may be configured to include an $I_{MIN}$ controller circuit 800. For at least one embodiment, the $I_{MIN}$ controller 800 may be connected to receive the $S_{FB}$ and $S_{VDD}$ signals and output a modified feedback signal $S_{FBM}$ to one or more primary switch controller and driver 106 components that are commonly utilized to control the operation of the first switch. The $I_{MIN}$ controller 800 is powered by $S_{VDD}$, which as discussed above can be generated by the third coil L3, and is connected to resistor R10, which has a fixed impedance of $Z_{FB}$. For at least one embodiment, the impedance of resistor R10 may be adjustable, as may be desired, for example, when a power converter is configured to provide variable output voltages, versus a fixed output voltage. An embodiment of a power converter so configured is described in U.S. patent application Ser. No. 15/683,939, filed on Aug. 23, 2017, the entire contents of which are incorporated herein by reference.

The $I_{MIN}$ controller 800 may also be configured to include diode D6 having an anode connected in parallel with port PP7 and resistor R10 and a cathode connected in series with a voltage divider circuit formed by resistors R11 and R12. The impedance values of resistors R11 and R12 are selected to scale the received feedback signal $S_{FB}$, as adjusted based on the output voltage of resistor R10, to generate a scaled feedback signal $S_{FBS}$ for input to a low voltage dominant bypass circuit 802.

The low voltage dominant bypass circuit 802 is configured to also receive a current limit signal $V_{CS-LIM}$. The current limit signal may be used to protect components from excessive currents by providing a high threshold limit which the pulse-by-pulse peaks of the primary current $I_P$ do not exceed. The low voltage dominant bypass circuit 802 outputs the lesser of the $S_{FBS}$ and $V_{CS-LIM}$ signals to a high voltage dominant bypass circuit 804.

The high voltage dominant bypass circuit 804 is also configured to receive a $V_{IMIN1}$ or a $V_{IMIN2}$ signal from selector 812 and compare such received signal with the low voltage dominant bypass output signal $S_{LD}$. The high voltage dominant bypass circuit 804 output the higher of the low voltage dominant bypass output signal SLD and the signal received from selector 812. In this manner, the power converter 700 may be configured to provide over-current protection for itself and any connected device during all modes of operation including powered, standby and transitions therebetween.

For at least one embodiment, selector 812 may be configured to select either the $V_{IMIN1}$ threshold or the $V_{IMIN2}$ threshold based on the last received feedback signal $S_{FB}$. More specifically, when a device is attached to the power converter 700 the feedback signal $S_{FB}$ will change rapidly, for example become high fast, due to some amount of current being loaded. Selector 812 may be configured to detect these changes and switch from the $V_{IMIN2}$ threshold to the $V_{IMIN1}$ threshold, which respectively represent the desired levels in the primary current $I_P$ during time periods t1 to t3, as shown in FIGS. 9A and 9B, where $V_{IMIN1}$ is used when a device is attached and $V_{IMIN2}$ is used when a device is not attached. The values of $V_{IMIN1}$ and $V_{IMIN2}$ for any given embodiment can be selected based upon mathematical analysis, experimental results, or otherwise.

As further shown in FIG. 9A for when a device is attached, the feedback signal $S_{FB}$ oscillates repeatedly over time in accordance with standard power converter operations over one or more powered switching cycles, as shown arising from $t_0$ to $t_4$. Over each such switching cycle, a nominal ripple, $S_{VDD\ (Ripple-Powered)}$ will typically occur in the applied voltage signal $S_{VDD}$.

As further shown in FIG. 9B for when a device is not attached, the switching cycle is extended, as shown for a standby switching cycle now arising from $t_0$ to $2t_0$. This results in a larger standby ripple $S_{VDD\ (Ripple-Standby)}$ arising during which the power converter uses less power than is used during powered mode. It is to be appreciated that the resulting applied voltage signal for standby mode is less than for powered mode, which are respectively shown in FIGS. 9B and 9A by the respective $S_{VDD\ (nominal\ standby)}$ and $S_{VDD\ (nominal\ powered)}$ values.

As further shown in FIG. 8, the IMIN controller circuit 800 may be connected, for at least one embodiment, to a comparator 808 of a primary switch controller circuit 806. The comparator 808 may also be connected a leading-edge blanking circuit 810 and a switch driver 814. The switch driver 814 may be connected to an oscillator 812 and transmits the primary gate signal $S_{PG}$ during each switching cycle in accordance with at least the principles of operations shown in FIGS. 9A and 9B and/or as discussed otherwise herein. The principles of operation of the components of the primary switch controller circuit 806 are well known in the art.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The components used and described herein may be provided in one or more integrated circuit assemblies and may include the use of commonly known circuit elements including, but not limited to, logical, discrete elements, active and passive elements. Other embodiments are therefore contemplated. It is intended that all matter contained in the above description and shown in the accompanying drawings shall be interpreted as illustrative only of embodiments and not limiting. References to first, second, etc. terminals, coils, components or otherwise are for purposes of explanation and clarity only and are not intended to be limiting. Changes in detail or structure may be made without departing from the basic elements of the invention as defined in the following claims.

What is claimed is:

1. A device, comprising:
an output controller comprising:
a second secondary port electrically coupled to a second coil of a power converter; and
a third secondary port;
wherein the output controller is configured to monitor a voltage potential at the third secondary port;
wherein the third secondary port is electrically grounded via a first resistance;
wherein, when an adaptive device is coupled to the output controller via the third secondary port, a voltage divider circuit is formed by an adaptive device resistance and the first resistance;
wherein the output controller is configured to detect a change in the voltage potential at the third secondary port when the voltage divider circuit is formed;
wherein the second coil provides electrical power to the output controller and the adaptive device when the power converter is in a powered mode; and
wherein an adaptive device battery provides power to the output controller while the power converter transitions from a standby mode to the powered mode.

2. The device of claim 1,
wherein the output controller is configured to receive a device wake-up signal.

3. The device of claim 2,
wherein the device wake-up signal is received at the third secondary port.

4. The device of claim 3,
wherein the adaptive device resistance arises between a device signaling circuit and the third secondary port;
wherein the device wake-up signal is output by the device signaling circuit; and wherein the output controller is configured to receive electrical power from the adaptive device battery when the adaptive device battery is electrically coupled to the second secondary port.

5. The device of claim 1,
wherein, to initiate a transition of the power converter from the standby mode to the powered mode, the adaptive device connects the adaptive device battery to the second secondary port.

6. The device of claim 1,
wherein the output controller is configured to receive a device wake-up signal [$S_{DWU}$] from the adaptive device at the third secondary port;
wherein upon receiving the device wake-up signal, the output controller is configured to initiate a transition mode during which the power converter transitions from the standby mode to the powered mode;
wherein during the standby mode, the output controller is unpowered; and
wherein during the transition mode, the output controller receives electrical power from the adaptive device battery.

7. The device of claim 1,
wherein the output controller further comprises:
a first secondary port electrically coupled to a data coupling device; and
wherein the output controller is configured to selectively operate a transmitting side of an opto-coupler while the power converter transitions from the standby mode to the powered mode.

8. The device of claim 1,
wherein the power converter further comprises a primary controller communicatively coupled to the output controller via an opto-coupler having a transmitting side and a receiving side; and
wherein, while the power converter transitions from the standby mode to the powered mode, the output controller is configured to selectively ground the transmitting side of the opto-coupler to communicate a request to the primary controller.

9. The device of claim 8,
wherein the output controller further comprises:
a wake-up circuit configured to perform at least one of operation comprising:
monitoring the voltage potential at the third secondary port;
detecting another change in the voltage potential at the third secondary port; and
selectively grounding the transmitting side of the opto-coupler.

10. The device of claim 9,
wherein, during the powered mode, the opto-coupler is configured to communicate a feedback signal to the primary controller.

11. A secondary controller for a power converter, comprising:
a first secondary port;
a second secondary port; and
a third secondary port;
wherein the secondary controller is configured to communicate, via the first secondary port, at least one signal to a primary controller of the power converter;
wherein the secondary controller is configured to receive electrical power, via the second secondary port, from a second coil of the power converter during a powered mode and from an adaptive device during a transition mode;

wherein the secondary controller is configured to detect a change in voltage potential arising when the adaptive device is connected to the power converter; and
wherein the change in the voltage potential is detected, at the third secondary port, using a voltage divider circuit formed by an adaptive device resistance and a first resistance coupled to the third secondary port.

12. The secondary controller for a power converter of claim 11,
wherein the at least one signal communicated via the first secondary port includes at least one of a wake-up signal and a feedback signal.

13. The secondary controller for a power converter of claim 11,
wherein a device wake-up signal is received at the third secondary port while the second secondary port is electrically connected to and receives electrical power from an adaptive device battery.

14. The secondary controller of claim 13,
wherein a wake-up signal is communicated to the primary controller upon the secondary controller receiving the device wake-up signal from the adaptive device.

15. The secondary controller for a power converter of claim 11, further comprising:
a wake-up circuit, coupled to the third secondary port, configured to communicate a wake-up signal to the primary controller; and
wherein the wake-up circuit is configured to detect the change in voltage potential.

16. A method for operating a power converter, comprising:
during a powered mode of operation,
receiving electrical power, by a secondary controller for a power converter, from a second coil of a transformer in the power converter;
during a standby mode of operation,
powering down the secondary controller; and
monitoring a voltage potential at a port of the secondary controller;
initiating a transition mode of operation by,
detecting a change in the voltage potential;
wherein the change in voltage potential occurs when an adaptive device resistance and a grounded first resistance, coupled to the port of the secondary controller, form a voltage divider circuit that changes the voltage potential; and
during the transition mode of operation,
receiving electrical power, by the secondary controller, from an adaptive device battery.

17. The method of operating a power converter of claim 16, comprising:
during the transition mode of operation,
receiving, by the secondary controller, a device wake-up signal from the adaptive device.

18. The method of operating a power converter of claim 17, further comprising:
during the transition mode of operation,
stabilizing operation of the power converter until an applied voltage signal increases to a given voltage level;
wherein the applied voltage signal is communicated in a feedback signal transmitted by the secondary controller to a primary controller;
wherein the powered mode of operation occurs upon the applied voltage signal reaching the given voltage level; and during the powered mode of operation,
providing an output power by the power converter to the adaptive device.

19. The method of claim 18, further comprising:
in response to the device wake-up signal,
communicating a request by the secondary controller to the primary controller.

20. The method of operating a power converter of claim 16, further comprising:
communicating a request by the secondary controller to a primary controller, by
selectively grounding a transmit side of an opto-coupler; and
wherein the transmit side of the opto-coupler is electrically coupled to the secondary controller and a receive side of the opto-coupler is electrically coupled to the primary controller.

\* \* \* \* \*